US010283162B2

(12) United States Patent
Shaburova et al.

(10) Patent No.: US 10,283,162 B2
(45) Date of Patent: May 7, 2019

(54) METHOD FOR TRIGGERING EVENTS IN A VIDEO

(71) Applicant: Avatar Merger Sub II, LLC., Minneapolis, MN (US)

(72) Inventors: Elena Shaburova, Castro Valley, CA (US); Victor Shaburov, Castro Valley, CA (US)

(73) Assignee: Avatar Merger Sub II, LLC, Minneapolis, MN (US)

( * ) Notice: Subject to any disclaimer, the term of this patent is extended or adjusted under 35 U.S.C. 154(b) by 0 days.

(21) Appl. No.: 14/314,343

(22) Filed: Jun. 25, 2014

(65) Prior Publication Data
US 2015/0221338 A1    Aug. 6, 2015

Related U.S. Application Data

(60) Provisional application No. 61/936,016, filed on Feb. 5, 2014.

(51) Int. Cl.
*G11B 27/031*    (2006.01)
*G06T 13/40*     (2011.01)
(Continued)

(52) U.S. Cl.
CPC .......... *G11B 27/031* (2013.01); *G06F 3/011* (2013.01); *G06K 9/00261* (2013.01);
(Continued)

(58) Field of Classification Search
CPC .......... G06K 9/3241; G06K 9/00711; G06K 9/00302; G06T 13/40; G06T 19/20; G06F 3/011
(Continued)

(56) References Cited

U.S. PATENT DOCUMENTS 4,888,713 A    12/1989 Falk
5,359,706 A    10/1994 Sterling
(Continued)

FOREIGN PATENT DOCUMENTS

CA    2887596 A1    7/2015

OTHER PUBLICATIONS

Dornaika, F., Davoine, F.: On appearance based face and facial action tracking. IEEE Trans. Circuits Syst. Video Technol. 16(9), Sep. 2006: p. 1107-1124).
(Continued)

*Primary Examiner* — Thai Q Tran
*Assistant Examiner* — Jose M Mesa
(74) *Attorney, Agent, or Firm* — Schwegman Lundberg & Woessner, P.A.

(57) ABSTRACT

A computer implemented method of triggering events in a video, the method comprising: providing a list of objects with their states and corresponding events in video such that each state from the list triggers at least one event of the corresponding events, wherein each object from the list has at least one state triggering at least one event of the corresponding events from the list in video; detecting at least one object from the list that at least partially and at least occasionally is presented in frames of the video; tracking the at least one object and its state; triggering at least one event of the corresponding events from the list in video in case the state of the at least one object matches with one of its states from the list.

18 Claims, 8 Drawing Sheets

(51) Int. Cl.
*G06T 17/20* (2006.01)
*G06T 19/20* (2011.01)
*H04N 5/262* (2006.01)
*G06K 9/46* (2006.01)
*G06K 9/52* (2006.01)
*G06T 11/60* (2006.01)
*H04N 9/79* (2006.01)
*G06T 7/33* (2017.01)
*G06T 7/246* (2017.01)
*G06T 7/90* (2017.01)
*G06T 5/00* (2006.01)
*G06T 11/00* (2006.01)
*G06F 3/01* (2006.01)
*G06K 9/00* (2006.01)
*G06N 99/00* (2019.01)

(52) U.S. Cl.
CPC ..... *G06K 9/00268* (2013.01); *G06K 9/00281* (2013.01); *G06K 9/00302* (2013.01); *G06K 9/00335* (2013.01); *G06K 9/00711* (2013.01); *G06K 9/00744* (2013.01); *G06K 9/46* (2013.01); *G06K 9/4652* (2013.01); *G06K 9/4661* (2013.01); *G06K 9/52* (2013.01); *G06N 99/005* (2013.01); *G06T 5/005* (2013.01); *G06T 7/246* (2017.01); *G06T 7/251* (2017.01); *G06T 7/33* (2017.01); *G06T 7/90* (2017.01); *G06T 11/001* (2013.01); *G06T 11/60* (2013.01); *G06T 13/40* (2013.01); *G06T 17/20* (2013.01); *G06T 19/20* (2013.01); *H04N 5/262* (2013.01); *H04N 9/79* (2013.01); *G06K 2009/4666* (2013.01); *G06T 2207/10016* (2013.01); *G06T 2207/10021* (2013.01); *G06T 2207/10024* (2013.01); *G06T 2207/20036* (2013.01); *G06T 2207/30201* (2013.01)

(58) Field of Classification Search
USPC ......................................................... 386/271
See application file for complete search history.

(56) References Cited

U.S. PATENT DOCUMENTS

| | | | |
|---|---|---|---|
| 5,479,603 | A | 12/1995 | Stone et al. |
| 6,038,295 | A | 3/2000 | Mattes |
| 6,252,576 | B1 | 6/2001 | Nottingham |
| H2003 | H | 11/2001 | Minner |
| 6,621,939 | B1 | 9/2003 | Negishi et al. |
| 6,768,486 | B1 | 7/2004 | Szabo et al. |
| 6,807,290 | B2 | 10/2004 | Liu et al. |
| 6,897,977 | B1 | 5/2005 | Bright |
| 6,980,909 | B2 | 12/2005 | Root et al. |
| 7,034,820 | B2 | 4/2006 | Urisaka et al. |
| 7,039,222 | B2 | 5/2006 | Simon et al. |
| 7,119,817 | B1 | 10/2006 | Kawakami |
| 7,167,519 | B2 | 1/2007 | Comaniciu et al. |
| 7,173,651 | B1 | 2/2007 | Knowles |
| 7,212,656 | B2 | 5/2007 | Liu et al. |
| 7,227,567 | B1 | 6/2007 | Beck et al. |
| 7,239,312 | B2 | 7/2007 | Urisaka et al. |
| 7,411,493 | B2 | 8/2008 | Smith |
| 7,535,890 | B2 | 5/2009 | Rojas |
| 7,564,476 | B1 | 7/2009 | Coughlan et al. |
| 7,697,787 | B2 | 4/2010 | Illsley |
| 7,812,993 | B2 | 10/2010 | Bright |
| 7,945,653 | B2 * | 5/2011 | Zuckerberg ............ G06Q 30/02 709/206 |
| 8,131,597 | B2 | 3/2012 | Hudetz |
| 8,199,747 | B2 | 6/2012 | Rojas et al. |
| 8,230,355 | B1 | 7/2012 | Bauermeister et al. |
| 8,253,789 | B2 | 8/2012 | Aizaki et al. |
| 8,295,557 | B2 | 10/2012 | Wang et al. |
| 8,296,456 | B2 | 10/2012 | Klappert |
| 8,332,475 | B2 | 12/2012 | Rosen et al. |
| 8,718,333 | B2 | 5/2014 | Wolf et al. |
| 8,724,622 | B2 | 5/2014 | Rojas |
| 8,761,497 | B2 | 6/2014 | Berkovich et al. |
| 8,766,983 | B2 | 7/2014 | Marks et al. |
| 8,874,677 | B2 | 10/2014 | Rosen et al. |
| 8,909,679 | B2 | 12/2014 | Roote et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,232,189 | B2 | 1/2016 | Shaburov et al. |
| 9,364,147 | B2 | 6/2016 | Wakizaka et al. |
| 9,396,525 | B2 | 7/2016 | Shaburova et al. |
| 9,443,227 | B2 | 9/2016 | Evans et al. |
| 9,489,661 | B2 | 11/2016 | Evans et al. |
| 9,491,134 | B2 | 11/2016 | Rosen et al. |
| 9,928,874 | B2 | 3/2018 | Shaburova |
| 2002/0012454 | A1 | 1/2002 | Liu et al. |
| 2003/0107568 | A1 | 6/2003 | Urisaka et al. |
| 2003/0228135 | A1 | 12/2003 | Illsley |
| 2004/0119662 | A1 | 6/2004 | Dempski |
| 2004/0130631 | A1 | 7/2004 | Suh |
| 2004/0233223 | A1 | 11/2004 | Schkolne et al. |
| 2005/0046905 | A1 | 3/2005 | Aizaki et al. |
| 2005/0117798 | A1 | 6/2005 | Patton et al. |
| 2005/0128211 | A1 | 6/2005 | Berger et al. |
| 2005/0180612 | A1 | 8/2005 | Nagahashi et al. |
| 2005/0190980 | A1 | 9/2005 | Bright |
| 2005/0202440 | A1 | 9/2005 | Fletterick et al. |
| 2006/0170937 | A1 | 8/2006 | Takahashi |
| 2006/0227997 | A1 * | 10/2006 | Au ..................... G06K 9/00771 382/103 |
| 2007/0013709 | A1 | 1/2007 | Charles et al. |
| 2007/0258656 | A1 | 11/2007 | Aarabi et al. |
| 2007/0268312 | A1 | 11/2007 | Marks et al. |
| 2008/0184153 | A1 | 7/2008 | Matsumura et al. |
| 2008/0212894 | A1 | 9/2008 | Demirli et al. |
| 2009/0158170 | A1 | 6/2009 | Narayanan et al. |
| 2010/0177981 | A1 | 7/2010 | Wang et al. |
| 2010/0188497 | A1 | 7/2010 | Aizaki et al. |
| 2011/0018875 | A1 | 1/2011 | Arahari et al. |
| 2011/0202598 | A1 | 8/2011 | Evans et al. |
| 2011/0273620 | A1 | 11/2011 | Berkovich et al. |
| 2012/0106806 | A1 * | 5/2012 | Folta ................. G06K 9/00295 382/118 |
| 2012/0144325 | A1 | 6/2012 | Mital et al. |
| 2012/0167146 | A1 | 6/2012 | Incorvia |
| 2012/0209924 | A1 | 8/2012 | Evans et al. |
| 2012/0306853 | A1 | 12/2012 | Wright et al. |
| 2013/0004096 | A1 | 1/2013 | Goh et al. |
| 2013/0190577 | A1 | 7/2013 | Brunner et al. |
| 2013/0201187 | A1 * | 8/2013 | Tong ...................... G06T 17/00 345/420 |
| 2013/0208129 | A1 | 8/2013 | Stenman |
| 2013/0287291 | A1 | 10/2013 | Cho |
| 2014/0043329 | A1 | 2/2014 | Wang et al. |
| 2014/0228668 | A1 | 8/2014 | Wakizaka et al. |
| 2015/0097834 | A1 | 4/2015 | Ma et al. |
| 2015/0131924 | A1 | 5/2015 | He et al. |
| 2015/0145992 | A1 | 5/2015 | Traff |
| 2015/0195491 | A1 | 7/2015 | Shaburov et al. |
| 2015/0213604 | A1 | 7/2015 | Li et al. |
| 2015/0221069 | A1 | 8/2015 | Shaburova et al. |
| 2015/0221118 | A1 | 8/2015 | Shaburova |
| 2015/0221136 | A1 | 8/2015 | Shaburova et al. |
| 2015/0222821 | A1 | 8/2015 | Shaburova |
| 2016/0322079 | A1 | 11/2016 | Shaburova et al. |

OTHER PUBLICATIONS

"U.S. Appl. No. 14/314,312, Non Final Office Action dated Nov. 5, 2015", 26 pgs.

(56) References Cited

OTHER PUBLICATIONS

"U.S. Appl. No. 14/314,312, Response filed Apr. 5, 2016 to Non Final Office Action dated Nov. 5, 2015", 13 pgs.
"U.S. Appl. No. 14/314,324, Non Final Office Action dated Nov. 5, 2015", 23 pgs.
"U.S. Appl. No. 14/314,324, Response filed Apr. 5, 2016 to Non Final Office Action dated Nov. 5, 2015", 15 pgs.
"U.S. Appl. No. 14/314,334, Non Final Office Action dated Nov. 13, 2015", 39 pgs.
"U.S. Appl. No. 14/314,334, Response filed Apr. 13, 2016 to Non Final Office Action dated Nov. 13, 2015", 20 pgs.
"U.S. Appl. No. 14/325,477, Non Final Office Action dated Oct. 9, 2015", 17 pgs.
"U.S. Appl. No. 14/325,477, Notice of Allowance dated Mar. 17, 2016", 5 pgs.
"U.S. Appl. No. 14/325,477, Response filed Feb. 9, 2016 to Non Final Office Action dated Oct. 9, 2015", 13 pgs.
John, Wiley, et al., "Digital Image Processing: Principles and Applications", Baxes, (1994), 88-91.
"U.S. Appl. No. 14/314,312, Final Office Action dated May 5, 2016", 28 pgs.
"U.S. Appl. No. 14/314,324, Final Office Action dated May 5, 2016", 24 pgs.
"U.S. Appl. No. 14/314,334, Final Office Action dated May 16, 2016", 43 pgs.
"U.S. Appl. No. 14/314,312, Final Office Action dated Apr. 12, 2017", 34 pgs.
"U.S. Appl. No. 14/314,312, Respnse filed Mar. 17, 2017 to Non Final Office Action dated Oct. 17, 2016", 12 pgs.
"U.S. Appl. No. 14/314,324, Final Office Action dated May 3, 2017", 33 pgs.
"U.S. Appl. No. 14/114,124, Response filed Oct. 5, 2016 to Final Office Action dated May 5, 2016", 14 pgs.
"U.S. Appl. No. 14/314,312, Non Final Office Action dated Oct. 17, 2016", 33 pgs.
"U.S. Appl. No. 14/314,312, Response filed Oct. 5, 2016 to Final Office Action dated May 5, 2016", 12 pgs.
"U.S. Appl. No. 14/314,324, Non Final Office Action dated Oct. 14, 2016", 26 pgs.
"U.S. Appl. No. 14/314,324, Response filed Feb. 14, 2017 to Non Final Office Action dated Oct. 14, 2016", 19 pgs.
"U.S. Appl. No. 14/314,324, Response Filed Oct. 5, 2016 to Final Office Action dated May 5, 2016", 14 pgs.
"U.S. Appl. No. 14/314,334, Non Final Office Action dated Dec. 1, 2016", 45 pgs.
"U.S. Appl. No. 14/314,334, Response filed Oct. 17, 2016 to Final Office Action dated May 16, 2016", 16 pgs.
"U.S. Appl. No. 15/208,973, Preliminary Amendment filed Jan. 17, 2017", 9 pgs.
Chen, et al., "Manipulating, Deforming and Animating Sampled Object Representations", Computer Graphics Forum vol. 26, (2007), 824-852 pgs.
Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

"U.S. Appl. No. 14/314,312, Non Final Office Action dated Aug. 30, 2017", 32 pgs.
"U.S. Appl. No. 14/314,312, Response filed Aug. 14, 2017 to Final Office Action dated Apr. 12, 2017", 16 pgs.
"U.S. Appl. No. 14/314,324, Advisory Action dated Sep. 21, 2017", 4 pgs.
"U.S. Appl. No. 14/314,324, Notice of Allowance dated Nov. 8, 2017", 7 pgs.
"U.S. Appl. No. 14/314,324, Response filed Sep. 1, 2017 to Final Office Action dated May 3, 2017", 10 pgs.
"U.S. Appl. No. 14/314,324, Response filed Nov. 3, 2017 to Advisory Action dated Sep. 21, 2017", 11 pgs.
"U.S. Appl. No. 14/314,334, Examiner Interview Summary dated Apr. 28, 2017", 3 pgs.
"U.S. Appl. No. 14/314,334, Final Office Action dated Jul. 12, 2017", 40 pgs.
"U.S. Appl. No. 14/314,334, Non Final Office Action dated Jan. 22, 2018", 35 pgs.
"U.S. Appl. No. 14/314,334, Notice of Allowance dated Sep. 19, 2017", 5 pgs.
"U.S. Appl. No. 14/314,334, Response filed May 20, 2017 to Non Final Office Action dated Dec. 1, 2016", 16 pgs.
"U.S. Appl. No. 14/314,334, Response filed Sep. 1, 2017 to Final Office Action dated Jul. 12, 2017", 12 pgs.
"U.S. Appl. No. 15/208,973, Non Final Office Action dated Sep. 19, 2017", 17 pgs.
Ahlberg, J, "Candide-3—an updated parameterised face", Image Coding Group, Dept of electrical Engineering, (Jan. 2001), 1-16.
Milborrow, S, et al., "Locating facial features with an extended active shape model", Department of Electrical Engineering University of Cape Town, South Africa www.milbo.users.sonic.net, (2008), 1-11.
"U.S. Appl. No. 14/314,312, Final Office Action dated May 10, 2018", 32 pgs.
"U.S. Appl. No. 14/314,312, Response filed Feb. 28, 2018 to Non Final Office Action dated Aug. 30, 2017", 13 pgs.
"U.S. Appl. No. 14/314,334, Final Office Action dated May 31, 2018", 38 pgs.
"U.S. Appl. No. 14/314,334, Response Filed Apr. 23, 2018 to Non Final Office Action dated Jan. 22, 2018", 14 pgs.
"U.S. Appl. No. 15/208,973, Final Office Action dated May 10, 2018", 13 pgs.
"U.S. Appl. No. 14/314,312, Response filed Sep. 6, 2018 to Final Office Action dated May 10, 2018", 12 pgs.
"U.S. Appl. No. 14/314,334, Response filed Aug. 30, 18 to Final Office Action dated May 31, 2018", 13 pgs.
"U.S. Appl. No. 15/208,973, Response filed Sep. 5, 2018 to Final Office Action dated May 10, 2018", 10 pgs.
"U.S. Appl. No. 14/314,312, Non Final Office Action dated Nov. 27, 2018", 29 pgs.
"U.S. Appl. No. 14/314,334, Examiner Interview Summary dated Nov. 26, 2018", 3 pgs.
"U.S. Appl. No. 14/314,334, Non Final Office Action dated Oct. 26, 2018", 39 pgs.
"U.S. Appl. No. 15/208,973, Notice of Allowance dated Nov. 20, 2018", 14 pgs.

* cited by examiner

METHOD FOR TRIGGERING EVENTS IN A VIDEO

CROSS-REFERENCE TO RELATED APPLICATIONS

This application claims the benefit of U.S. Provisional Application No. 61/936,016, filed on Feb. 28, 2014.

BACKGROUND OF THE INVENTION

Technical Field

The disclosed embodiments relate generally to the field of real-time video processing. In particular, the disclosed embodiments relate to a computerized system and a computer-implemented method of triggering events in a video.

Description of the Related Art

At the present time some programs can provide processing of still images. For example, U.S. Patent Application Publication No. US2007268312, incorporated herein by reference, discloses a method of replacing face elements by some components that is made by users for real-time video. However, it is not possible to process real time video in such a way that events can be triggered in a real-time vide stream.

Thus, new and improved systems and methods are needed that would enable real time video stream processing that involves triggering events in the video stream.

SUMMARY OF INVENTION

The embodiments described herein are directed to systems and methods that substantially obviate one or more of the above and other problems associated with the conventional technology for real time video stream processing.

In accordance with one aspect of the embodiments described herein, there is provided a computer implemented method of triggering events in a video, the method comprising: providing a list comprising a set of objects with their states and a set of events, wherein each object from the set of objects has at least one state triggering at least one event from the set of events in the video; detecting at least one object from the list that at least partially and at least occasionally is presented in frames of the video; tracking the at least one object and its state from frame to frame; and triggering at least one event of the set of events in the video in case the state of the at least one object matches a state from the set of states.

In one or more embodiments, the events the set of events are selected from a group including modification of the at least one object, modification of at least one part of the at least one object, masking of the at least one object, adding at least one new object into the frames of the video, using visual filters for the at least one object, and changing a background of the at least one object.

In one or more embodiments, the at least one event of the set of events is triggered in the video after a time delay.

In one or more embodiments, the computer implemented method further comprises: tracking the at least one object and its state after triggering one event of the set of events in the video; and removing the triggered event from the video in case of detecting change of the state of the at least one object.

In one or more embodiments, the triggered event is removed from the video in case of detecting a state of the at least one object, such that the state of the at least one object corresponds to its pre-triggering state, the pre-triggering state being defined as an average state based on at least one state prior to the state that triggered the event In one or more embodiments, the triggered event is removed from the video in case of detecting change of the state of the at least one object from the current state to another state opposite to the current state.

In one or more embodiments, the computer implemented method further comprises: removing the triggered event from the video after an amount of time.

In one or more embodiments, the objects from the list include a human's face and parts of a human body.

In one or more embodiments, the video comprises a real-time video stream.

In accordance with another aspect of the embodiments described herein, there is provided a computer implemented method of triggering events in a video, the method being performed in connection with a computerized system comprising a processing unit and a memory, the method comprising: providing a list comprising a set of objects with their states and a set of events, wherein each object from the set of objects has at least one state triggering at least one event from the set of events in the video; detecting at least one object from the list that at least partially and at least occasionally is presented in frames of the video; tracking the at least one object and its state; and triggering one random event from the list in video in case the state of the at least one object matches with one of its states from the list.

In accordance with yet another aspect of the embodiments described herein, there is provided a computer implemented method of triggering events in a video which frames comprise images of a user, the method comprising: providing a list comprising a set of pieces of information and a set of events, wherein each piece of information from the set of pieces of information triggers at least one event from the set of events in the video; providing information relating to the user; triggering at least one event from the set of events in video in case the information relating to the user matches with one of the pieces of information from the set of pieces of information.

In accordance with yet another aspect of the embodiments described herein, there is provided a mobile computerized system comprising a central processing unit and a memory, the memory storing instructions for: providing a list comprising a set of objects with their states and a set of events, wherein each object from the set of objects has at least one state triggering at least one event from the set of events in the video; detecting at least one object from the list that at least partially and at least occasionally is presented in frames of the video; tracking the at least one object and its state from frame to frame; and triggering at least one event of the set of events in the video in case the state of the at least one object matches a state from the set of states.

In one or more embodiments, the events the set of events are selected from a group including modification of the at least one object, modification of at least one part of the at least one object, masking of the at least one object, adding at least one new object into the frames of the video, using visual filters for the at least one object, and changing a background of the at least one object.

In one or more embodiments, the at least one event of the set of events is triggered in the video after a time delay.

In one or more embodiments, the memory further stores instructions for: tracking the at least one object and its state after triggering one event of the set of events in the video; and removing the triggered event from the video in case of detecting change of the state of the at least one object.

In one or more embodiments, the triggered event is removed from the video in case of detecting a state of the at least one object, such that the state of the at least one object corresponds to its pre-triggering state, the pre-triggering state being defined as an average state based on at least one state prior to the state that triggered the event.

In one or more embodiments, the triggered event is removed from the video in case of detecting change of the state of the at least one object from the current state to another state opposite to the current state.

In one or more embodiments, the computer implemented method further comprises: removing the triggered event from the video after an amount of time.

BRIEF DESCRIPTION OF DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION OF THE INVENTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there is provided a computerized system and a computer-implemented method for triggering events in a video.

It will be appreciated that the present method for triggering events is applicable with any kind of video data, e.g. real-time video streams, video files saved in a memory of a computerized system of any kind (such as mobile computer devices, desktop computer devices and others), and all other possible types of video data understandable for those skilled in the art. Any kind of video data can be processed, and the embodiments disclosed herein are not intended to be limiting the scope of the present invention by indicating a certain type of video data. The techniques described herein can be implemented using any type of computing device including desktops, laptops, tablet computers, mobile phones, music players, multimedia players etc. having any kind of generally used operational system such as Windows®, iOS®, Android® and others. All disclosed embodiments and examples are non-limiting to the invention and disclosed for illustrative purposes only.

Figure 1:
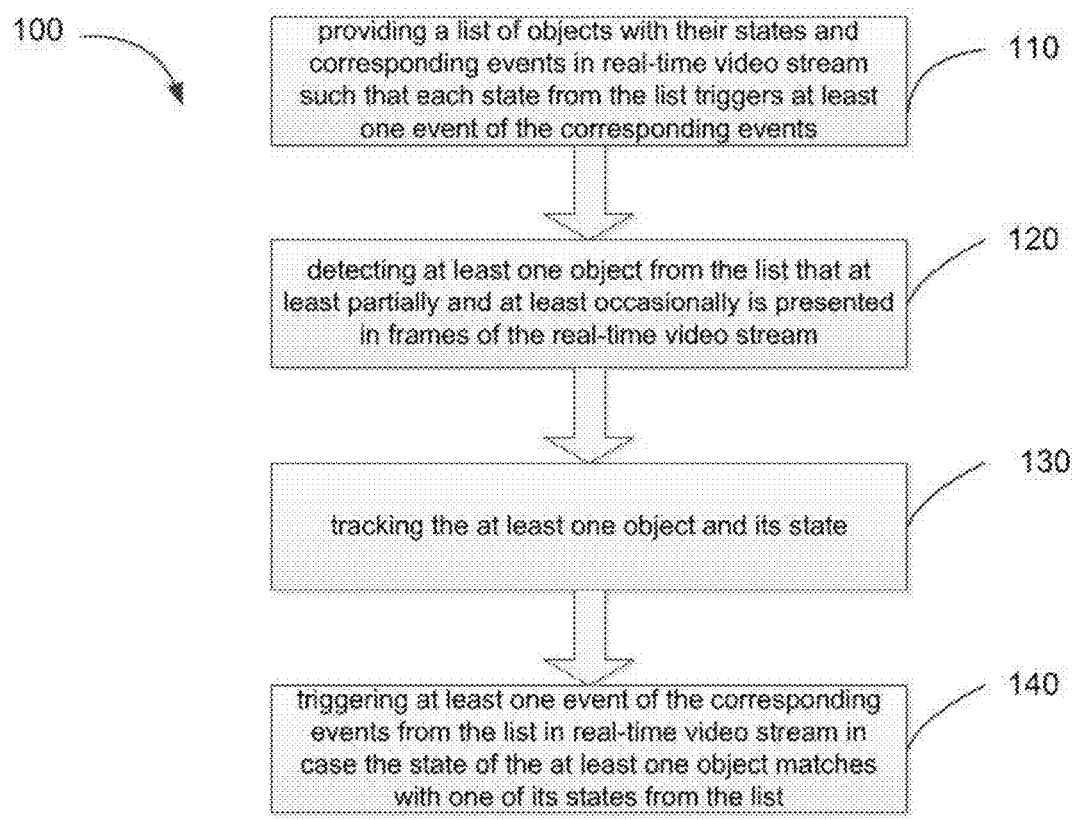
FIG. 1 illustrates a method of a method of triggering events in a video according to the first embodiment of the invention.

The embodiments disclosed further are aimed for processing of real-time video streams, however all other types of video data including video files saved in a memory of a computerized system can be processed by the methods of the present invention. For example, a user can load video files and save them in a memory of his computerized system and such video files can be also processed by the methods of the present invention. An exemplary method 100 according to the first embodiment is illustrated in FIG. 1. The method 100 includes providing a list of objects with their states and corresponding events in real-time video stream (stage 110). Each state from the list triggers at least one event of the corresponding events, and each object from the list has at least one state triggering at least one event of the corresponding events from the list in real-time video stream. Further, at least one object from the list is detected that at least partially and at least occasionally is presented in frames of the real-time video stream (stage 120) and the at least one object and its state is tracked (stage 130). In case the state of the at least one object matches with one of its states from the list at least one event from the list is triggered in the real-time video stream (stage 140). Triggering of an event can be made immediately or after a time delay.

In one or more embodiments, any kind of events can be triggered in real-time video stream. For example, they can be selected from a group including modification of the at least one object, modification of at least one part of the at least one object, masking of the at least one object, adding at least one new object into the frames of the real-time video stream, using visual filters for the at least one object, and changing a background of the at least one object.

In one or more embodiments, the triggered event can be removed form a real-time video stream after an amount of time or after fulfilling of certain conditions. For example, in some embodiments of the invention the at least one object and its state are tracked after triggering the event from the list, and the triggered event is removed if a change of the state of the object is detected. The change of the state can include returning to original state of the object, or the change of the state can be made to another state opposite to the current state.

For example, in different embodiments of the present invention opening a mouth turns a person to a zombie, closing one eye turns a person to a cat, raising a nose with a finger turns a person to a pig, or showing horns with fingers turns a person to a deer. When mentioned signs are not shown any more a person's image returns to original state.

In one or more embodiments, it is not necessary that triggered events are strictly determined by the objects and their states. For example, in a method 200 according to the second embodiment of the invention (FIG. 1) events for triggering are chosen randomly. More specifically, the method 200 includes providing a list of objects with their states and events in real-time video stream such that each state from the list triggers one of the events from the list (stage 210), detecting at least one object from the list that at least partially and at least occasionally is presented in frames of the real-time video stream (stage 220), tracking the at least one object and its state (stage 230), and triggering one random event from the list in real-time video stream in case the state of the at least one object matches with one of its states from the list (stage 240).

It should be noted that any objects can be processed by the method of the present invention including such objects as a human's face and parts of a human body.

In one or more embodiments, information relating to a user can be used for triggering events in a real-time video stream. A method 300 of triggering events in real-time video stream which frames comprise images of a user according to the first embodiment of the invention is illustrated in FIG. 1. The method 300 includes providing a list of pieces of information and corresponding events in real-time video stream (stage 310) such that each piece of information from the list triggers at least one event of the corresponding events; providing an information relating to the user (stage 320), and triggering at least one event of the corresponding events from the list in real-time video stream in case the information relating to the user matches with one of the pieces of information from the list (330). Information relating to the user can be obtained for the user of from other open sources like social networks.

Face detection and face tracking techniques are discussed in greater detail below.

Face Detection and Initialization

In one or more embodiments, first in the algorithm for changing proportion a user sends a request for changing proportions of an object in a video stream. The next step in the algorithm involves detecting the object in the video stream.

In one or more embodiments, the face is detected on an image with use of Viola-Jones method. Viola-Jones method is a fast and quite accurate method used to detect the face region. Then, an Active Shape Model (ASM) algorithm is applied to the face region of an image to detect facial feature reference points. However, it should be appreciated that other methods and algorithms suitable for face detection can be used.

Figure 2:
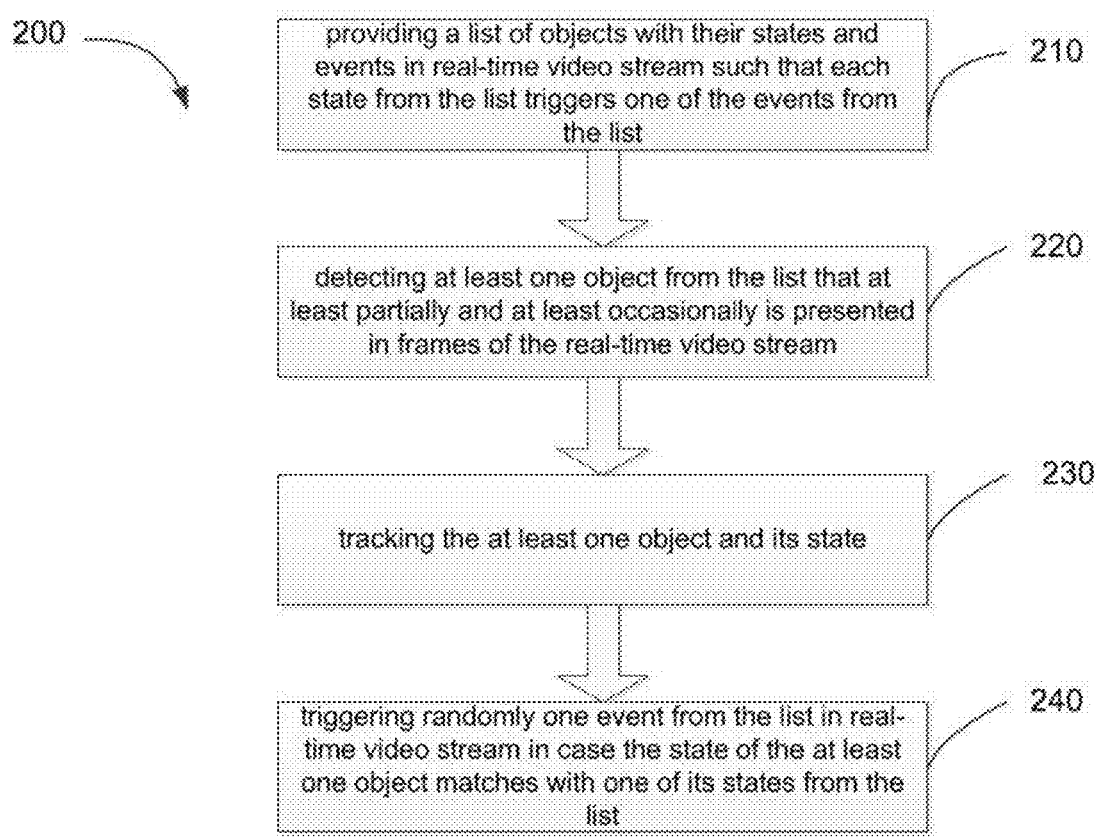
FIG. 2 illustrates a method of a method of triggering events in a video according to the second embodiment of the invention.

In one or more embodiments, for locating facial features locating of landmarks is used. A landmark represents a distinguishable point present in most of the images under consideration, for example, the location of the left eye pupil (FIG. 2).

In one or more embodiments, a set of landmarks forms a shape. Shapes are represented as vectors: all the x-followed by all the y-coordinates of the points in the shape. One shape is aligned to another with a similarity transform (allowing translation, scaling, and rotation) that minimizes the average Euclidean distance between shape points. The mean shape is the mean of the aligned training shapes (which in the present disclosure are manually landmarked faces).

Subsequently, in accordance with the ASM algorithm, the search for landmarks from the mean shape aligned to the position and size of the face determined by a global face detector is started. It then repeats the following two steps until convergence (i) suggest a tentative shape by adjusting the locations of shape points by template matching of the image texture around each point (ii) conform the tentative shape to a global shape model. The individual template matches are unreliable and the shape model pools the results of the weak template matchers to form a stronger overall classifier. The entire search is repeated at each level in an image pyramid, from coarse to fine resolution. It follows that two types of submodel make up the ASM: the profile model and the shape model.

In one or more embodiments, the profile models (one for each landmark at each pyramid level) are used to locate the approximate position of each landmark by template matching. Any template matcher can be used, but the classical ASM forms a fixed-length normalized gradient vector (called the profile) by sampling the image along a line (called the whisker) orthogonal to the shape boundary at the landmark. During training on manually landmarked faces, at each landmark the mean profile vector $\bar{g}$ and the profile covariance matrix Sg are calculated. During searching, the landmark along the whisker to the pixel whose profile g has lowest Mahalanobis distance from the mean profile $\bar{g}$ is displaced, where the $$\text{MahalanobisDistance} = (g - \bar{g})^T S_g^{-1} (g - \bar{g}). \quad (1)$$

In one or more embodiments, the shape model specifies allowable constellations of landmarks. It generates a shape $\hat{x}$ with $$\hat{x} = \bar{x} + \_n \quad (2)$$

where $\bar{x}$ is the mean shape, is a parameter vector, and is a matrix of selected eigenvectors of the covariance matrix Sg of the points of the aligned training shapes. Using a standard principal components approach, model has as much variation in the training set as it is desired by ordering the eigenvalues λi of Ss and keeping an appropriate number of the corresponding eigenvectors in φ. In the method, a single shape model for the entire ASM is used but it is scaled for each pyramid level.

Subsequently the Equation 2 is used to generate various shapes by varying the vector parameter b. By keeping the elements of b within limits (determined during model building) it is possible to ensure that generated face shapes are lifelike.

Conversely, given a suggested shape x, it is possible to calculate the parameter b that allows Equation 2 to best approximate x with a model shape $\hat{x}$. An iterative algorithm, described by Cootes and Taylor, that gives the b and T that minimizes $$\text{distance}(x, T(\bar{x} + \_b)) \quad (3)$$

where T is a similarity transform that maps the model space into the image space is used.

In one or more embodiments, mapping can be built from facial feature reference points, detected by ASM, to Candide-3 point, and that gives us Candide-3 points x and y coordinates. Candide is a parameterised face mask specifically developed for model-based coding of human faces. Its low number of polygons (approximately 100) allows fast reconstruction with moderate computing power. Candide is controlled by global and local Action Units (AUs). The global ones correspond to rotations around three axes. The local Action Units control the mimics of the face so that different expressions can be obtained.

The following equation system can be made, knowing Candide-3 points x and y coordinates.

$$\sum_{j=1}^{m} \Box X_{ij} * B_j = x_i. \quad (4)$$

$$\sum_{j=1}^{m} \Box Y_{ij} * B_j = y_i. \quad (5)$$

where Bj-j-th shape unit, xi, yi-i-th point coordinates, Xij, Yij-coefficients, which denote how the i-th point coordinates are changed by j-th shape unit. In this case, this system is over determined, so it cancan be solved precisely. Thus, the following minimization is made:

$$\left(\sum_{j=1}^{m} \Box X_{ij} * B_j - x_i.\right)^2 + \left(\sum_{j=1}^{m} \Box Y_{ij} * B_j - y_i\right)^2 \to \min \Box \quad (6)$$

Let's denote $X=((X_{ij})^T,(Y_{ij})^T, x=((x_i)^T,(y_i)^T)^T, B=(B_j)^T$. (7)

This equation system is linear, so it's solution is $$B=(X^TX)^{-1}X^Tx \quad (8)$$

In one or more embodiments, i is also possible to use Viola-Jones method and ASM to improve tracking quality. Face tracking methods usually accumulate error over time, so they can lose face position after several hundred frames. In order to prevent it, in the present invention the ASM algorithm is run from time to time to re-initialize tracking algorithm.

Face Tracking

Figure 3:
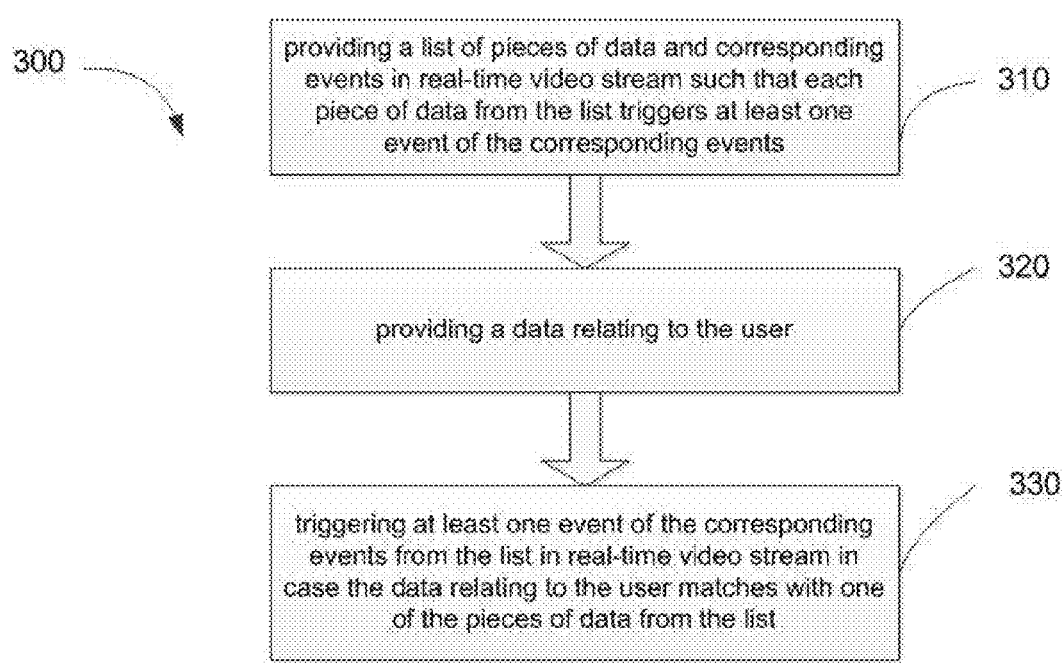
FIG. 3 illustrates a method of a method of triggering events in a video according to the third embodiment of the invention.

In one or more embodiments, the next step comprises tracking the detected object in the video stream. In the present invention the abovementioned Candide-3 model is used (see Ahlberg, J.: Candide-3, an updated parameterized face. Technical report, Linkoping University, Sweden (2001)) for tracking face in a video stream. The mesh or mask corresponding to Candide-3 model is shown in FIG. 3.

Figure 4:
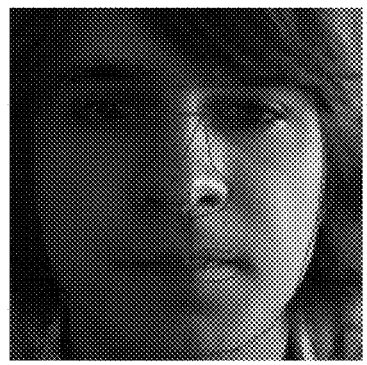
FIG. 4 illustrates facial feature reference points detected by an ASM algorithm used in the method according to one embodiment of the present invention.
Figure 4:
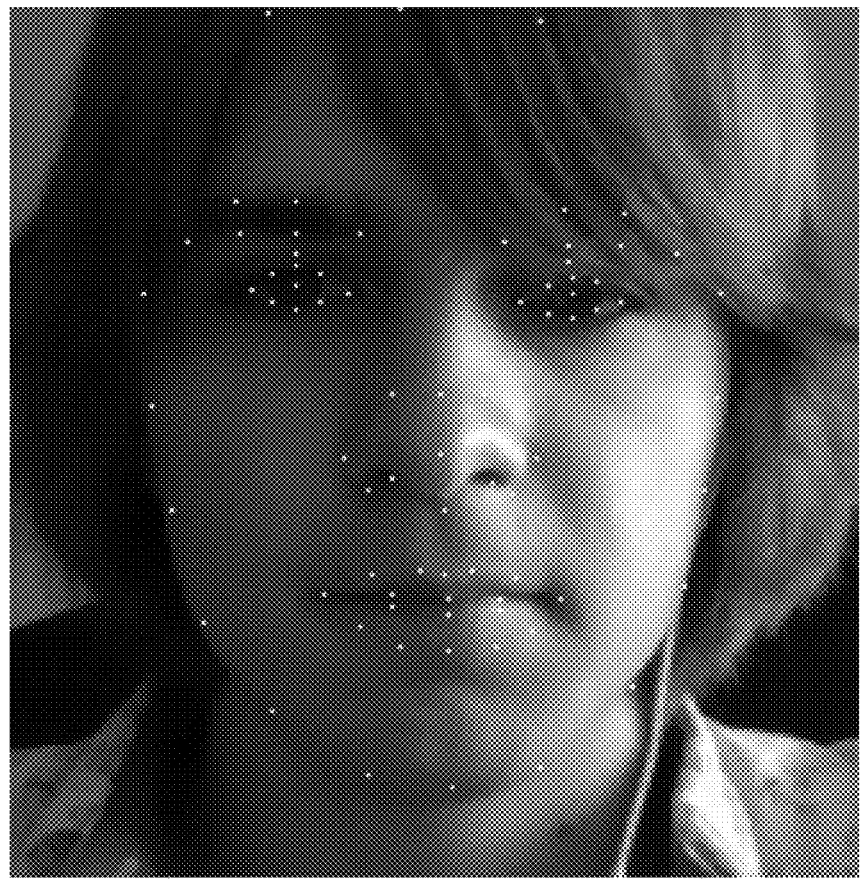
Figure 5:
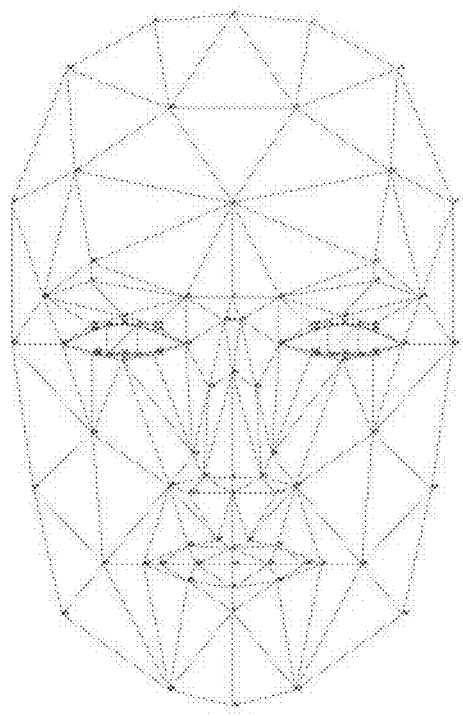
FIG. 5 illustrates Candide-3 model used in the method according to one embodiment of the present invention.
Figure 6A:
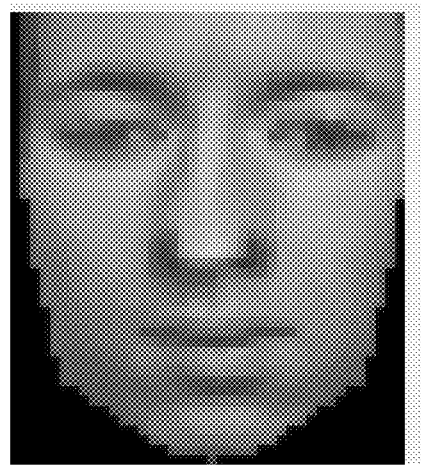
FIG. 6(a) and FIG. 6(b) show an example of a mean face (a) and an example of current observation.
Figure 6B:
Figure 7:
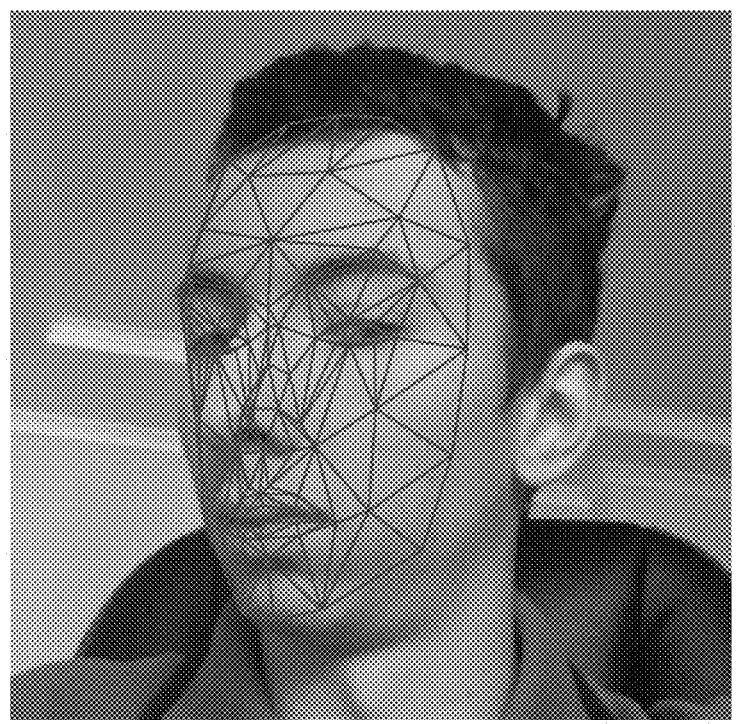
FIG. 7 illustrates Candide at a frame used in the method according to one embodiment of the present invention.

In one or more embodiments, a state of the model can be described by shape units intensity vector, action units intensity vector and a position-vector. Shape units are some main parameters of a head and a face, in the present invention the following 10 units are used:

Eyebrows vertical position
Eyes vertical position
Eyes width
Eyes height
Eye separation distance
Nose vertical position
Nose pointing up
Mouth vertical position
Mouth width
Chin width In one or more embodiments, action units are face parameters that correspond to some face movement. In the present invention the following 7 units are used:

Upper lip raiser
Jaw drop
Lip stretcher
Left brow lowerer
Right brow lowerer
Lip corner depressor
Outer brow raiser In one or more embodiments, the mask position at a picture can be described using 6 coordinates: yaw, pitch, roll, x, y, scale. The main idea of the algorithm proposed by Dornaika et al. (Dornaika, F., Davoine, F.: On appearance based face and facial action tracking. IEEE Trans. Circuits Syst. Video Technol. 16(9):1107-1124 (2006)) is to find the mask position, which observes the region most likely to be a face. For each position it is possible to calculate observation error—the value which indicates the difference between image under current mask position and the mean face. An example of the mean face and of the observation under current position is illustrated in FIGS. 4(*a*)-3(*b*). FIG. 4(*b*) corresponds to the observation under the mask shown in FIG. 5.

In one or more embodiments, a face is modeled as a picture with a fixed size (width=40px, height=46px) called a mean face. Gaussian distribution that proposed in original algorithms has shown worse result in compare with static image. So the difference between current observation and a mean face is calculated in the following way:

$$e(b)=\Sigma\mathbf{(}(\log(1+I_m)-\log(1+\mathbf{]}I_i))^2 \quad (9)$$

Logarithm function makes tracking more stable.

In one or more embodiments, to minimize error Taylor series is used as it was proposed by Dornaika at. el. (see F. Dornaika, F. Davoine, On appearance based face and facial action tracking, in IEEE Transactions on Circuits and Systems for Video Technology, 16(9), September, 2006, p. 1107-1124). It was found that it is not necessary to sum up a number of finite difference when calculating an approximation to first derivative. Derivative is calculated in the following way:

$$g_{ij} = \frac{W(y_t, b_t + \_b_t)_{ij} - W(y_t, b_t - \_b_t)_{ij}}{-j} \quad (10)$$

Here $g_{ij}$ is an element of matrix G. This matrix has size m*n, where m is large enough (about 1600) and n is small (about 14). In case of straight-forward calculating there have to be done n*m operations of division. To reduce the number of divisions this matrix can be rewritten as a product of two matrices:

$$G=A*B$$

Where matrix A has the same size as G and its element is:

$$a_{ij}=W(y_t,b_t+\_b_t)_{ij}-W(y_t,b_t-\_b_t)_{ij} \quad (11)$$

and matrix B is a diagonal matrix with sizes n*n, and $b_{ii}=\_i^{-1}$

Now Matrix $G_t^+$ has to be obtained and here is a place where a number of divisions can be reduced.

$$G_t^+=(G^TG)^{-1}G^T=(B^TA^TAB)^{-1}B^TA^T=$$
$$B^{-1}(A^TA)^{-1}B^{-1}BA^T=B^{-1}(A^TA)^{-1}A^T \quad (12)$$

After that transformation this can be done with n*n divisions instead of m*n.

One more optimization was used here. If matrix $G_t^+$ is created and then multiplied to $\Box b_t$, it leads to $n^2m$ operations, but if first $A^T$ and $\Box b_t$ are multiplied and then $B^{-1}$ $(A^TA)^{-1}$ with it, there will be only $n*m+n^3$ operations, that is much better because n<<m.

Thus, the step of tracking the detected object in the video stream in the present embodiment comprises creating a mesh that is based on the detected feature reference points of the object and aligning the mesh to the object on each frame.

It should be also noted that to increase tracking speed in the present invention multiplication of matrices is performed in such a way, that it can be boosted using ARM advanced SIMD extensions (also known as NEON). Also, the GPU is used instead of CPU whenever possible. To get high performance of the GPU, operations in the present invention are grouped in a special way.

Thus, exemplary embodiment of the tracking technique described herein has the following advantageous features:
1. Before tracking Logarithm is applied to the grayscale value of each pixel to track it. This transformation has a great impact to tracking performance.
2. In the procedure of gradient matrix creation, the step of each parameter depends on the scale of the mask.

Exemplary Computer Platform

Figure 8:
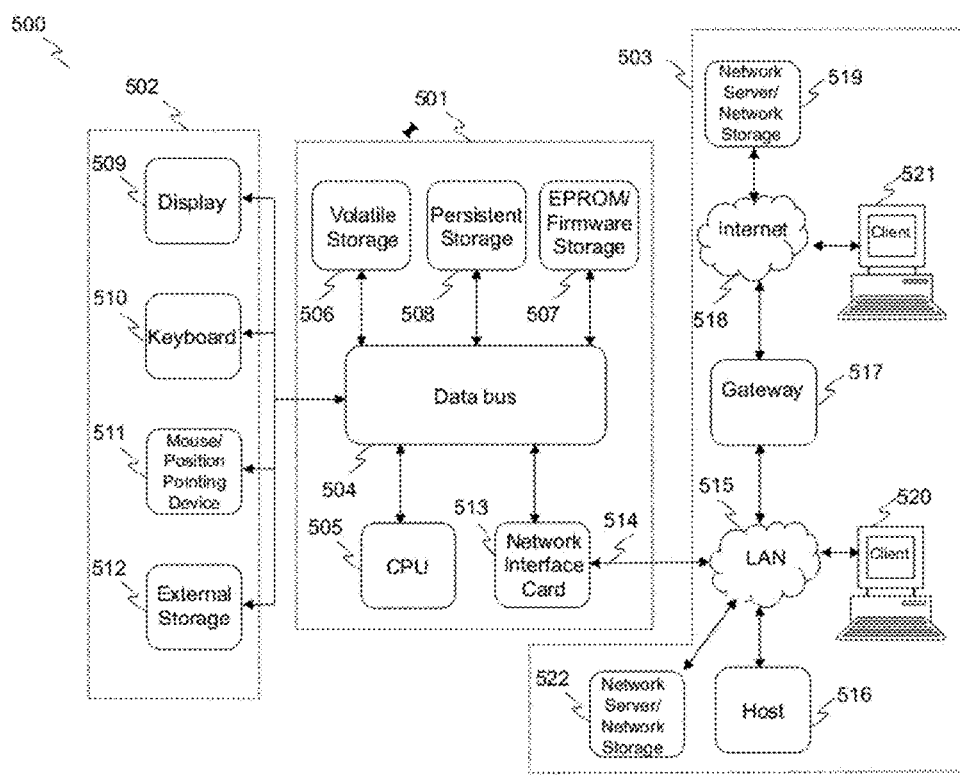
FIG. 8 illustrates an exemplary embodiment of a computer platform based on which the techniques described herein may be implemented.

FIG. 8 is a block diagram that illustrates an embodiment of a computer system 500 upon which various embodiments of the inventive concepts described herein may be implemented. The system 500 includes a computer platform 501, peripheral devices 502 and network resources 503.

The computer platform 501 may include a data bus 504 or other communication mechanism for communicating information across and among various parts of the computer platform 501, and a processor 505 coupled with bus 504 for processing information and performing other computational and control tasks. Computer platform 501 also includes a volatile storage 506, such as a random access memory (RAM) or other dynamic storage device, coupled to bus 504 for storing various information as well as instructions to be executed by processor 505, including the software application for implementing multifunctional interaction with elements of a list using touch-sensitive devices described above. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 504 for storing information and instructions.

Computer platform 501 may be coupled via bus 504 to a touch-sensitive display 509, such as a cathode ray tube (CRT), plasma display, or a liquid crystal display (LCD), for displaying information to a system administrator or user of the computer platform 501. An input device 510, including alphanumeric and other keys, is coupled to bus 504 for communicating information and command selections to processor 505. Another type of user input device is cursor control device 511, such as a mouse, a trackball, or cursor direction keys for communicating direction information and command selections to processor 505 and for controlling cursor movement on touch-sensitive display 509. This input device typically has two degrees of freedom in two axes, a first axis (e.g., x) and a second axis (e.g., y), that allows the device to specify positions in a plane. To detect user's gestures, the display 509 may incorporate a touchscreen interface configured to detect user's tactile events and send information on the detected events to the processor 505 via the bus 504.

An external storage device 512 may be coupled to the computer platform 501 via bus 504 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as the persistent storage device 508. Volatile media includes dynamic memory, such as volatile storage 506.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 504. The bus 504 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 504. Communication interface 513 provides a two-way data communication coupling to a network link 514 that is coupled to a local network 515. For example, communication interface 513 may be an integrated services digital network (ISDN) card or a modem to provide a data communication connection to a corresponding type of telephone line. As another example, communication interface 513 may be a local area network interface card (LAN NIC)

to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 514 typically provides data communication through one or more networks to other network resources. For example, network link 514 may provide a connection through local network 515 to a host computer 516, or a network storage/server 522. Additionally or alternatively, the network link 514 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 514 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 515 and communication interface 513. In the Internet example, when the system 501 acts as a network server, it might transmit a requested code or data for an application program running on client(s) 520 and/or 521 through the Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for real time video stream processing.

It is intended that the specification and examples be considered as exemplary only, with a true scope and spirit of the invention being indicated by the following claims.

What is claimed is:

1. A computer-implemented method for triggering events in a video, the method being performed in connection with a computerized system comprising a processing unit and a memory, the method comprising:

providing a list comprising a set of objects, a set of object states associated with the set of objects, and a set of events, wherein the set of objects are associated with one or more images of a user and each object from the set of objects has at least one object state triggering at least one event from the set of events in the video and each object state is associated with at least one point of an object of the set of objects;

detecting a face of the user within frames of the video, the face including a set of landmark points corresponding to facial features;

aligning a mesh with the face of the user, the mesh containing a set of feature reference points, each feature reference point corresponding to a landmark point of the set of landmark points;

detecting at least one object from the list that at least partially and at least occasionally is presented in frames of the video, the at least one object including at least a portion of the set of feature reference points, the portion of the set of feature reference points aligned with one or more points of the at least one object;

tracking the at least one object across two or more frames, the at least one object having a first object state;

identifying a change in the first object state of the at least one object to a second object state, the change from the first object state to the second object state corresponding to movement of a first portion of landmark points relative to one or more feature reference points of the mesh, indicating movement of the first portion of landmark points on the face of the user, while a second portion of landmark points remain aligned with corresponding feature reference points of the mesh;

determining that the second object state of the at least one object matches a state from the set of object states; and in response to determining the match, triggering at least one event of the set of events in the video, the at least one event modifying the one or more images of the user by:

selecting a visualization from a plurality of visualizations associated with the at least one event; and replacing at least a portion of the face, associated with the feature reference point within the frames of the video, with the selected visualization to modify the video, the feature reference point corresponding to the at least one point moved by the change from the first object state to the second object state.

2. The computer-implemented method of claim 1, wherein the second object state comprises a facial gesture, and wherein the plurality of visualizations includes a plurality of animal depictions.

3. The computer-implemented method of claim 1, wherein the set of object states comprises a plurality of facial gestures, wherein each of the plurality of facial gestures is associated with a different animal depiction of a plurality of animal depictions.

4. The computer-implemented method of claim 1, further comprising:

tracking the at least one object and its state after triggering one event of the set of events in the video; and removing the triggered event from the video in case of detecting change of the state of the at least one object.

5. The computer-implemented method of claim 4, wherein the triggered event is removed from the video in case of detecting a state of the at least one object, such that the state of the at least one object corresponds to its pre-triggering state, the pre-triggering state being defined as an average state based on at least one state prior to the state that triggered the event.

6. The computer-implemented method of claim 4, wherein the triggered event is removed from the video in case of detecting change of the state of the at least one object from a current state to another state opposite to the current state.

7. The computer-implemented method of claim 1, further comprising:
after triggering the at least one event, removing the selected visualization from the video after an amount of time.

8. The computer-implemented method of claim 1, wherein the objects from the list include a human's face and parts of a human body.

9. The computer implemented method of claim 1, wherein the video comprises a real-time video stream.

10. A computer implemented method for triggering events in a video, the method being performed in connection with a computerized system comprising a processing unit and a memory, the method comprising:
providing a list comprising a set of objects, a set of object states associated with the set of objects, and a set of events, wherein the set of objects are associated with one or more images of a user and each object from the set of objects has at least one object state triggering at least one event from the set of events in the video and each object state is associated with at least one point of an object of the set of objects;
detecting a face of the user within frames of the video, the face including a set of landmark points corresponding to facial features;
aligning a mesh with the face of the user, the mesh containing a set of feature reference points, each feature reference point corresponding to a landmark point of the set of landmark points;
detecting at least one object from the list that at least partially and at least occasionally is presented in frames of the video, the at least one object including at least a portion of the set of feature reference points, the portion of the set of feature reference points aligned with one or more points of the at least one object;
tracking the at least one object having a first object state across two or more frames;
identifying a change in the first object state of the at least one object to a second object state, the change from the first object state to the second object state corresponding to movement of a first portion of landmark points relative to one or more feature reference points of the mesh, indicating movement of the first portion of landmark points on the face of the user, while a second portion of landmark points remain aligned with corresponding feature reference points of the mesh;
determining the second object state of the at least one object matches a state from the set of object states; and
in response to determining the match, triggering one random event from the list in video, the random event modifying the one or more images of the user and the mesh aligned with the face of the user by:
selecting a visualization from a plurality of visualizations associated with the random event; and
replacing at least a portion of the face, associated with at least one feature reference point of the set of feature reference points within the frames of the video, with the selected visualization to modify the video.

11. A computer-implemented method of triggering events in a video which frames comprise images of a user and one or more objects associated with the images of the user, the method being performed in connection with a computerized system comprising a processing unit and a memory, the method comprising:
providing a list comprising a set of pieces of information and a set of events, wherein each piece of information from the set of pieces of information triggers at least one event from the set of events in the video, and wherein each event from the set of events modifies an object of the one or more objects associated with the images of the user;
detecting a face of the user within frames of the video, the face including a set of landmark points corresponding to facial features;
aligning a mesh with the face of the user, the mesh containing a set of feature reference points, each feature reference point corresponding to a landmark point of the set of landmark points;
identifying a change in the first object state of the at least one object to a second object state, the change from the first object state to the second object state corresponding to movement of a first portion of landmark points relative to one or more feature reference points of the mesh, indicating movement of the first portion of landmark points on the face of the user, while a second portion of landmark points remain aligned with corresponding feature reference points of the mesh;
determining the information relating to the user matches at least one of the pieces of information from the set of pieces of information; and
in response to identifying the information, triggering at least one event from the set of events in video, the at least one event modifying at least one object of the one or more objects associated with the images of the user by:
selecting a visualization from a plurality of visualizations associated with the at least one event; and
replacing at least a portion of the face, associated with at least one feature reference point of the set of feature reference points within the frames of the video, with the selected visualization to modify the video.

12. A mobile computerized system comprising a central processing unit and a memory, the memory storing instructions for:
providing a list comprising a set of objects, a set of object states associated with the set of objects, and a set of events, wherein the set of objects are associated with one or more images of a user and each object from the set of objects has at least one object state triggering at least one event from the set of events in the video and each object state is associated with at least one point of an object of the set of objects;
detecting a face of the user within frames of the video, the face including a set of landmark points corresponding to facial features;
aligning a mesh with the face of the user, the mesh containing a set of feature reference points, each feature reference point corresponding to a landmark point of the set of landmark points;

detecting at least one object from the list that at least partially and at least occasionally is presented in frames of the video, the at least one object including at least a portion of the set of feature reference points, the portion of the set of feature reference points aligned with one or more points of the at least one object;

tracking the at least one object having a first object state across two or more frames;

identifying a change in the first object state of the at least one object to a second object state, the change from the first object state to the second object state corresponding to movement of a first portion of landmark points relative to one or more feature reference points of the mesh, indicating movement of the first portion of landmark points on the face of the user, while a second portion of landmark points remain aligned with corresponding feature reference points of the mesh;

determining the second object state of the at least one object matches a state from the set of object states; and in response to determining the match, triggering at least one event of the set of events in the video, the at least one event modifying the one or more images of the user by:

selecting a visualization from a plurality of visualizations associated with the at least one event; and replacing at least a portion of the face, associated with the feature reference point within the frames of the video, with the selected visualization to modify the video, the feature reference point corresponding to the at least one point moved by the change from the first object state to the second object state.

13. The mobile computerized system of claim 12, wherein the events in the set of events are selected from a group including modification of the at least one object, modification of at least one part of the at least one object, masking of the at least one object, adding at least one new object into the frames of the video, and using visual filters for the at least one object.

14. The mobile computerized system of claim 12, wherein the at least one event of the set of events is triggered in the video after a time delay.

15. The mobile computerized system of claim 12, wherein the memory further stores instructions for:

tracking the at least one object and its state after triggering one event of the set of events in the video; and removing the triggered event from the video in case of detecting change of the state of the at least one object.

16. The mobile computerized system of claim 15, wherein the triggered event is removed from the video in case of detecting a state of the at least one object, such that the state of the at least one object corresponds to its pre-triggering state, the pre-triggering state being defined as an average state based on at least one state prior to the state that triggered the event.

17. The mobile computerized system of claim 15, wherein the triggered event is removed from the video in case of detecting change of the state of the at least one object from the current state to another state opposite to the current state.

18. The mobile computerized system of claim 12, wherein the memory further stores instructions for:

after triggering the at least one event, removing the selected visualization from the video after an amount of time.

* * * * *

UNITED STATES PATENT AND TRADEMARK OFFICE
CERTIFICATE OF CORRECTION

PATENT NO. : 10,283,162 B2  
APPLICATION NO. : 14/314343  
DATED : May 7, 2019  
INVENTOR(S) : Shaburova et al.

Page 1 of 1

It is certified that error appears in the above-identified patent and that said Letters Patent is hereby corrected as shown below:

On the Title Page

On page 3, in Column 1, item (56), under "Other Publications", Line 27, delete "Respnse" and insert --Response-- therefor Signed and Sealed this  
Eighth Day of December, 2020

Andrei Iancu  
*Director of the United States Patent and Trademark Office*